United States Patent [19]
Kimura et al.

[11] 3,943,280
[45] Mar. 9, 1976

[54] TELEVISION RECEIVER WITH ZOOM STORAGE TUBE FRAME GRABBER WITH ELECTRONIC INSET INTO CONTINUING RECEIVED VIDEO STREAM

[75] Inventors: Takeji Kimura; Iwajiro Sembokuya, both of Hirakata; Hideo Hozumi; Tomio Oyama, both of Toyonaka, all of Japan

[73] Assignee: Matsushita Electric Industrial Company, Ltd., Osaka, Japan

[22] Filed: Jan. 9, 1973

[21] Appl. No.: 322,214

[30] Foreign Application Priority Data
Jan. 14, 1972 Japan.................................. 47-6329
Jan. 14, 1972 Japan.................................. 47-6330

[52] U.S. Cl............................ 178/7.5 R; 178/DIG. 6
[51] Int. Cl.²........................................... H04N 5/48
[58] Field of Search........... 178/7.3 R, 7.3 D, 7.5 R, 178/7.5 D, 6.8, 6.6 FS, DIG. 6, DIG. 35

[56] References Cited
UNITED STATES PATENTS
| | | | |
|---|---|---|---|
| 2,420,197 | 5/1947 | Rosenthal | 178/6.8 |
| 3,200,196 | 8/1965 | Jenkins | 178/6.8 |
| 3,710,017 | 1/1973 | Abe et al. | 178/DIG. 6 |
| 3,740,465 | 6/1973 | Dorsey | 178/6.6 FS |

*Primary Examiner*—Robert L. Griffin
*Assistant Examiner*—George G. Stellar
*Attorney, Agent, or Firm*—Stevens, Davis, Miller & Mosher

[57] ABSTRACT

In a television receiver, a video signal for a single frame at any moment is stored in a storage tube. The stored video signal is displayed, if necessary, as a still picture on a part of the picture tube screen together with the ordinary broadcasted television picture in motion.

5 Claims, 27 Drawing Figures

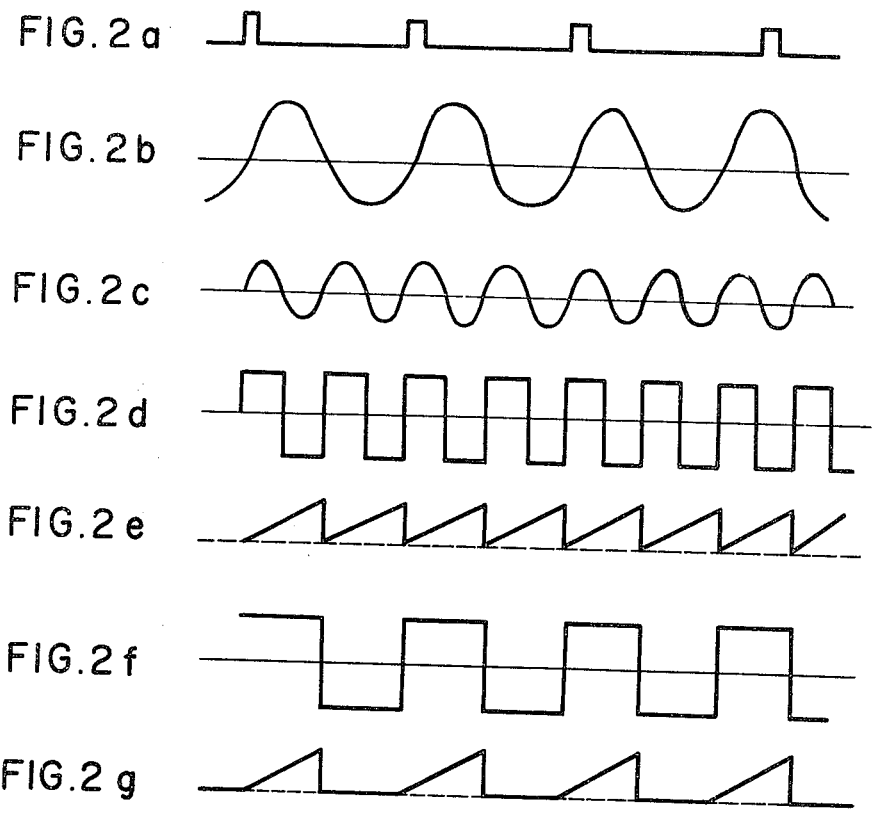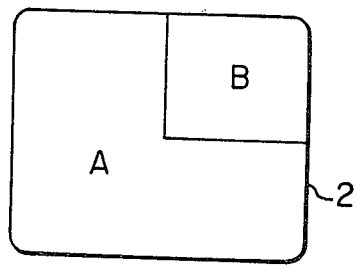

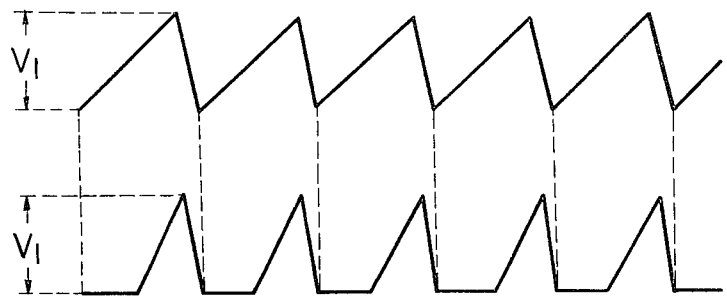
FIG. 4a
FIG. 4b
FIG. 4c
FIG. 4d
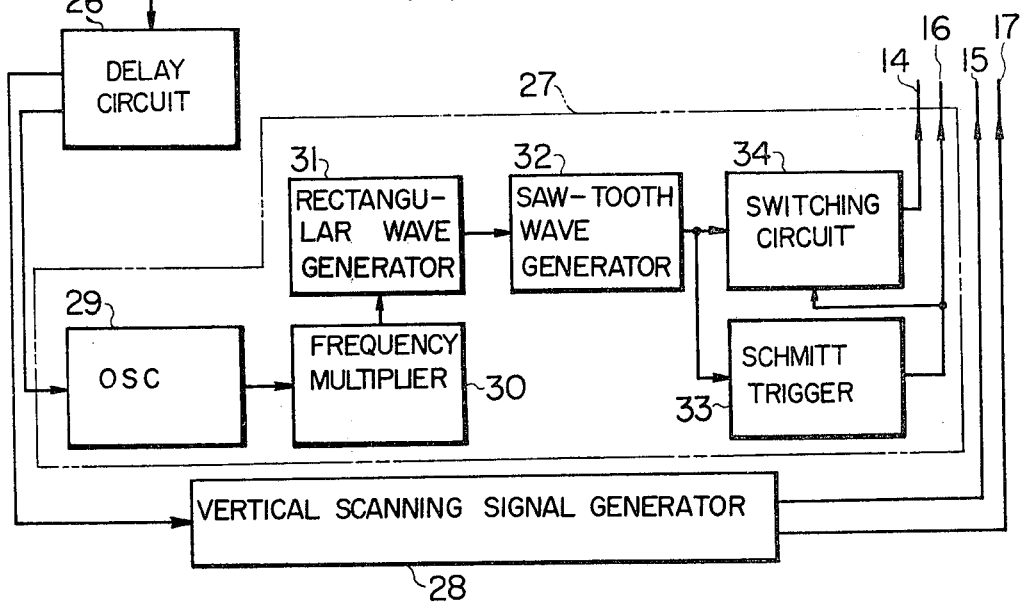
FIG. 5

FIG. 8 a
FIG. 8 b
FIG. 8 c
FIG. 8 d
FIG. 8 e
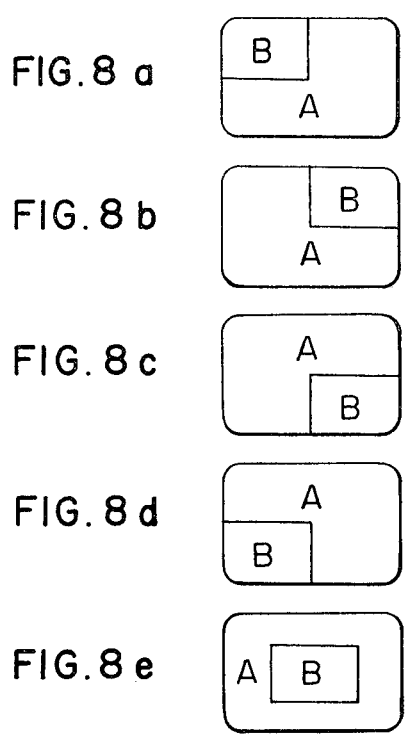
FIG. 9
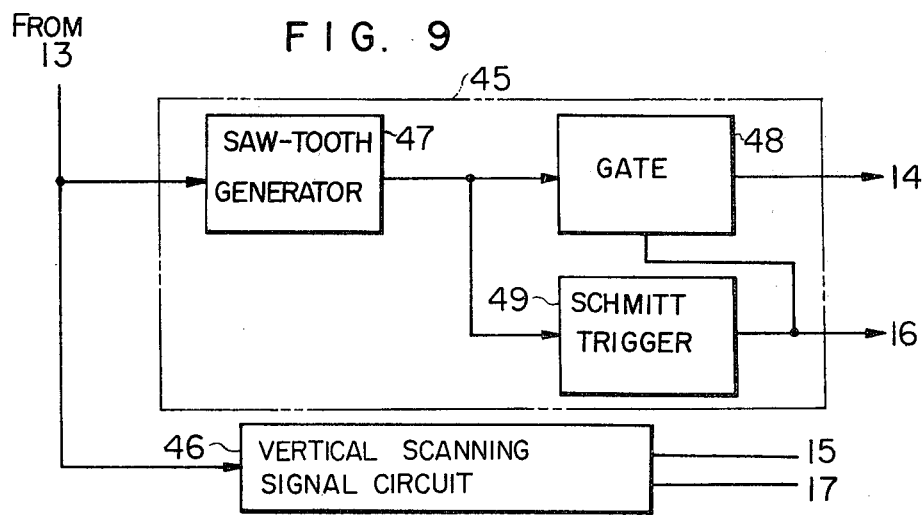

TELEVISION RECEIVER WITH ZOOM STORAGE TUBE FRAME GRABBER WITH ELECTRONIC INSET INTO CONTINUING RECEIVED VIDEO STREAM

The present invention relates to a television receiver.

Today, on-the-spot broadcasting of sports and cooking classes are among the television programs. Therefore, one may desire to watch a specific moment of the game in progress or the table of materials for a special cooking recipe as a still picture existing for a desired period of time.

It is therefore one object of the present invention to provide a television receiver on a part of the picture tube screen of which a still picture can be displayed by means of a simple circuit additionally incorporated in the receiver.

Another object of the present invention is to provide a television receiver which can display a desired moment of the ordinary television picture as a still picture on a part of the picture tube screen and in which the position of the still picture on the screen can be arbitrarily selected so as not to disturb the ordinary television picture in motion.

An additional object of the present invention is to provide a television receiver which can display a still picture on any desired part of the picture tube screen and in which the still picture can be freely zoomed so as to fit for close inspection.

For a better understanding of the present invention reference should be had to the attached drawings in which:

FIGS. 2a to 2g show waveforms appearing at several points in the television receiver shown in FIG. 1;

FIG. 3 shows a position of a picture displayed on the screen of the picture tube of the receiver;

FIGS. 4a to 4d show other waveforms apearing at points in the television receiver shown in FIG. 1;

FIG. 5 is a block diagram of a principal portion of a television receiver as another embodiment of the present invention;

FIGS. 8a to 8e show various positions of still pictures displayed on the screen of the picture tube;

FIG. 9 is a block diagram of a principal portion of a television receiver as a third embodiment of the present invention;

Figure 1:
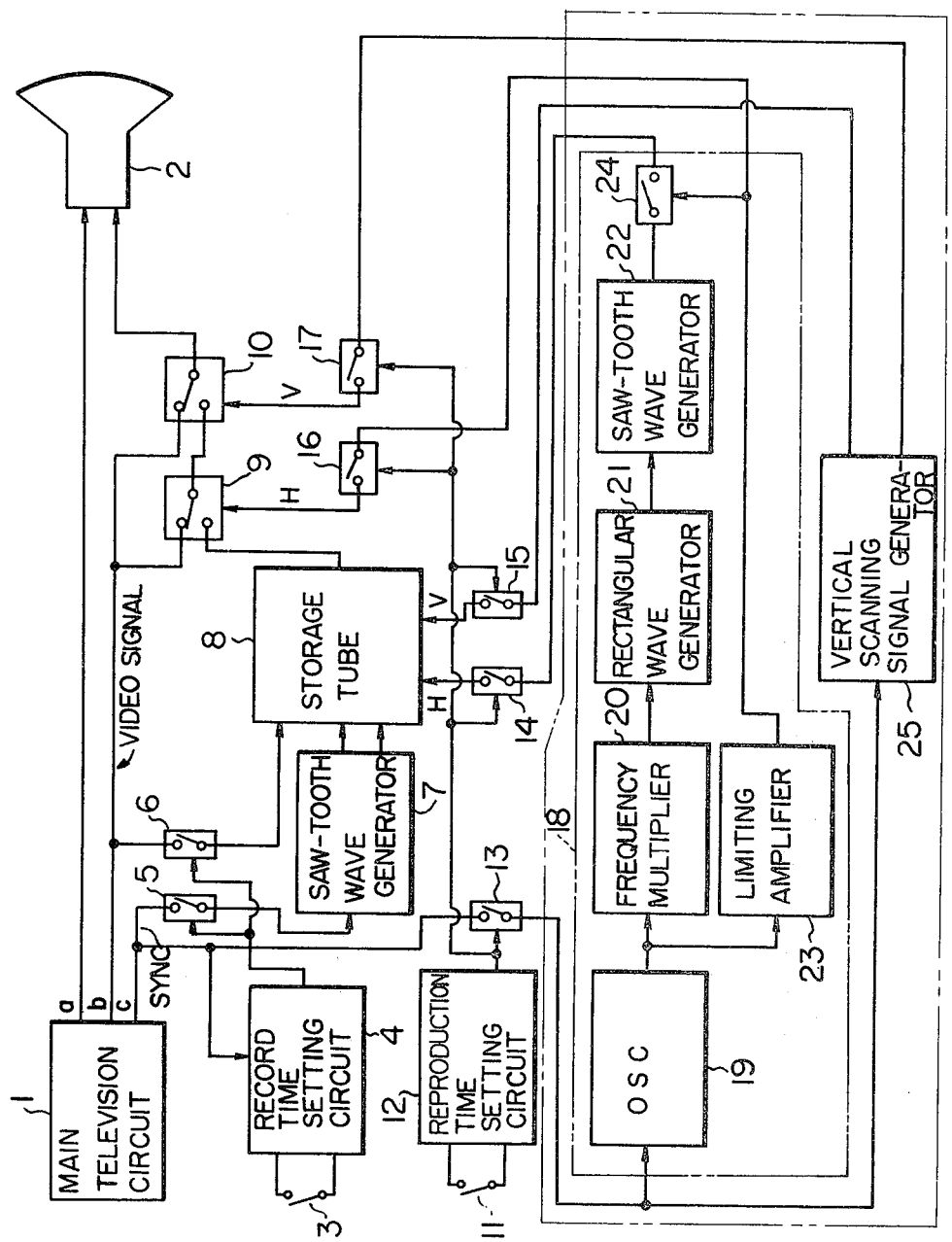
FIG. 1 is a block diagram of a television receiver as one embodiment of the present invention.

Now, the present invention will be explained by way of embodiments. In FIG. 1 which shows an exemplary constitution of a television receiver according to the present invention, a box labelled 1 indicates an ordinary television receiver circuit comprising a tuner, an IF amplifier, a discriminator, a video amplifier, an audio detector, an audio amplifier, a horizontal deflection circuit, a vertical deflection circuit, etc. The horizontal and vertical scanning signals are delivered at the terminal $a$ of the box 1, the video signal at the terminal $b$ and the synchronous signal at the terminal $c$. A switch 3 is to be actuated when a picture on the picture tube screen is desired to be recorded. A record time setting circuit 4 closes both a switch 5 to cut the line for transmitting a sync signal only during the time of one frame after a vertical sync signal immediately following the actuation of the switch 3 and a switch 6 to cut the line for transmitting a video signal. A saw-tooth wave generator 7 provides a horizontal and a vertical scanning signals for a storage tube 8. Change-over switches 9 and 10 perform selective switching operations in response respectively to the horizontal and the vertical sync signals and selectively apply the video signal fed directly from the main television circuit 1 or the video signal stored in the storage tube 8 to a picture tube 2. A switch 11 is to be actuated when it is desired to display the signal stored in the storage tube 2. A reproduction time setting circuit 12 such as, for example, a monostable multivibrator is so designed as to operate only for about 10 seconds so that the signal stored in the storage tube 8 may be displayed on the picture tube screen during a predetermined preset time after the throw of the switch 11. If in this case the circuit is so designed as to be held independent of the preset time of the multivibrator so long as the switch 11 is held on, a still picture can be continuously displayed during any desired period of time. The switch may also be so designed as to be automatically actuated after the throw of the switch 3 instead of being manually operated. Switches 13, 14, 15, 16 and 17 are all controlled by the reproduction time setting circuit 12. A circuit 18 generates a horizontal scanning signal applied to the storage tube 8 for reproduction of the stored picture and comprises blocks 19 to 24 described below. An oscillator 19 generates sinusoidal wave signal whose frequency is in timing with the synchronous signal. A frequency multiplier 20 serves to double the frequency of the sinusoidal signal. A limiting amplifier 21 derives a rectangular wave from the frequency-multiplied sinusoidal signal. A saw-tooth wave generator 22 is connected with the limiting amplifier 21 and a limiting circuit 23 converts the output of the oscillator 19 into a rectangular wave and also controls the switch 21 and the change-over switch 9. A circuit 25 generats a vertical scanning signal applied to the storage tube 8 for picture reproduction and also controls the change-over signal 10. The constitution of the circuit 25 is almost the same as that of the circuit 18 and the detailed description thereof is not given here. The only difference to be noted is that since the circuit 25 is for generating a vertical scanning signal, the frequency of the signal from the circuit 25 is lower than that of the horizontal scanning signal from the circuit 18.

Now, the operation of the television receiver as described above will be explained. In the ordinary operation where the switches 3 and 11 are not actuated and therefore the switches 9 and 10 assume the states as shown in FIG. 1, the horizontal and vertical scanning signals and the video signal from the main circuit 1 are applied to the picture tube 2 to visualize the televised program on the picture tube screen. In this case, the switches 5, 6 and 13 are all opened so that the storage tube 8 does not perform its recording and reproducing operation.

If, on the other hand, the switch 3 is actuated when the watcher wants to make a displayed picture still, then the setting circuit 4 delivers a control signal during the period of a frame just after the actuation of the switch 3 to close the switches 5 and 6. Accordingly, the synchronous signal is applied to the saw-tooth wave generator 7 to produce the horizontal and the vertical scanning signals for record. Therefore, the video signal as well as the scanning signals is applied to the storage tube 8 to record therein a picture corresponding to a single frame of the television system.

When it is desired to reproduce the picture stored in the storage tube 8, it is only necessary to actuate the switch 11. By actuating the switch 11 the setting circuit 12 is operated to close the switches 13 to 17 simultaneously during a predetermined period of time. The oscillator 19 receives the horizontal sync signal fed via the switch 13 whose waveform is shown in FIG. 2a and delivers the sinusoidal wave whose waveform is shown in FIG. 2b. This sinusoidal wave is passed through the frequency multiplier 20 so as to be converted to the frequency-doubled signal whose waveform is shown in FIG. 2c and the frequency-doubled signal is then converted through the limiting amplifier 21 to the rectangular wave whose waveform is shown in FIG. 2d. The rectangular wave is finally applied to the saw-tooth wave generator 22 to produce the saw-tooth wave whose waveform is shown in FIG. 2e. The saw-tooth wave is then applied to the switch 24, which is driven by the rectangular wave, shown in FIG. 2f, which is derived by limiting the output of the oscillator 19 through the limiting amplifier, to feed to the storage tube 8 the signal whose waveform is shown in FIG. 2g. If, in this case, the phase of the signal shown in FIG. 2f is inverted, the phase of the reproduction scanning signal applied to the storage tube 8 can be changed with respect to the horizontal sync signal. The output of the limiting amplifier 23 is applied via the switch 16 to the change-over switch 9 and the switch 9 is changed over from the state shown in FIG. 1 to the opposite state.

The circuit 25 delivers both the vertical sync signal for reproduction applied via the switch 15 to the storage tube 8 and a signal to control the change-over switch 10 via the switch 17. The video signal read out of the storage tube 8 is applied to the picture tube 2 via the switches 9 and 10 which are changed over for a predetermined period corresponding to a single frame, so that, as shown in FIG. 3, the ordinary television picture A being broadcast and the still picture B read from the storage tube 8 can be simultaneously displayed on the picture tube. In FIG. 3, the still picture B is shown occupying the upper right quarter of the screen, but it can be arbitrarily shifted to any other part on the screen, i.e. upper left, lower left and lower right. Moreover, the size of the still picture on the screen can be arbitrarily controlled and zooming as well as partial reproduction, of the stored picture is possible if the horizontal and vertical scanning signals for reproduction which are applied to the storage tube 8 and have waveforms shown in FIGS. 4a and 4c, are converted to the signals whose waveforms are shown in FIGS. 4b and 4d.

According to this embodiment, one and the same frame can be displayed as a still picture, if need be, and moreover an ordinary television receiver circuit can be utilized to display the stored picture. Further, the stored picture is displayed on a part of the picture tube screen so that the ordinary television information broadcasted from time to time is never missed. Thus, the embodiment is very useful and inexpensive.

FIG. 5 shows another example of a circuit for generating a saw-tooth wave signal, which is identified by the block 18 shown with dashed lines in FIG. 1. In FIG. 5, a delay circuit 26 retards the horizontal and vertical sync signals from the switch 13. A circuit 27 comprising constituents whose details are described later, generates a horizontal scanning signal applied to the storage tube 8 for reproduction of the stored picture. A circuit 28 generates a vertical scanning signal applied to the storage tube 8 for reproduction of the stored picture and has the same circuit configuration as the circuit 27, and the detailed description of the configuration is not given here. An oscillator 29 oscillates in time with the horizontal sync signal. A frequency multiplier 30 doubles the frequency of the sinusoidal wave generated by the oscillator 29. A limiting amplifier 31 derives a rectangular wave from the frequency-doubled sinusoidal wave. A saw-tooth wave generator 32 delivers a saw-tooth wave signal, which is applied to a circuit 33 such as a Schmitt trigger that performs a switching operation to generate a rectangular wave when the saw-tooth wave input reaches a predetermined level. The Schmitt trigger 33 also controls a switch 34 and the change-over switch 9.

Figure 6:
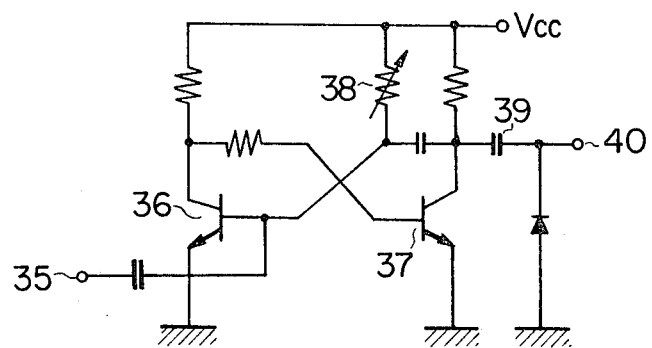
FIG. 6 is a circuit of a delay means used in the principal portion shown in FIG. 5.

FIG. 6 shows a concrete example of a circuit for the delay circuit 5 shown in FIG. 26. The delay circuit 26 includes a pair of circuits, one for horizontal scanning and the other for vertical scanning, each of which has a circuit configuration similar to that shown in FIG. 6. The terminal 35 receives the horizontal or vertical sync signal. Transistors 36 and 37 constitute a monostable multivibrator and a variable resistor 38 determines the quasi-stable period of the multivibrator. A capacitor 39 forms a differentiating circuit. At a terminal 40 is obtained a delayed synchronous signal.

Figure 7:
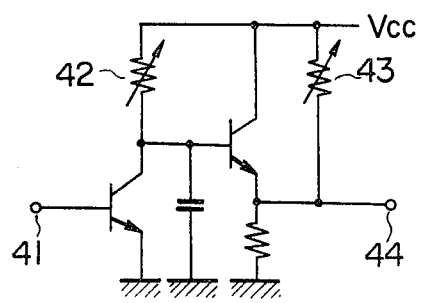
FIG. 7 is a circuit of a saw-tooth wave generator used in the present invention.

FIG. 7 shows a concrete example of a circuit configuration for the saw-tooth wave generator 32, comprising an input terminal 41, a variable resistor 42 to control the amplitude of the saw-tooth wave, a variable resistor 43 to change the dc level of the saw-tooth wave and an output terminal 44.

Now, the operation of the embodiment shown in FIG. 5 will be explained. When the picture stored in the storage tube 8 is displayed as a still picture on the picture tube screen, the synchronous signal is applied via the switch 13 to the delay circuit shown in FIG. 5. The delay time of this delay circuit can be rather arbitrarily controlled by adjusting the variable resistor 38 so that the position of the still picture on the screen is accordingly determined. The synchronous signal retarded by the delay circuit is applied to the blocks 27 and 28. The oscillating circuit 29 generates a sinusoidal wave in synchronism with the horizontal sync signal. The frequency of the sinusoidal wave signal is doubled through the frequency multiplier 30 and the frequency-doubled sinusoidal signal is then converted to a rectangular wave through the limiting amplifier. The rectangular wave is then converted to a saw-tooth wave through the saw-tooth wave generator. The operations of the blocks 29 and 32 are almost the same as those of the blocks 19 to 22. The configuration of the saw-tooth wave generator 32 is as shown in FIG. 7. The zooming of a still picture can be effected by controlling both the variable resistor 42 govering the scanning speed determined by the saw-tooth wave generator and the threshold value of the Schmitt trigger 33. The position of the still picture at which the zooming is performed, can be arbitrarily selected by shifting the variable resistor 43. In this way, the saw-tooth wave signal which has had its scanning rate and dc level adjusted, is fed through the switch 34 to the storage tube 8. The switch 34 is changed over by the output of the Schmitt trigger 33.

Thus, the zooming of the still picture can be performed by controlling the saw-tooth wave generator included respectively in the circuits 27 and 28 and the position of the still picture on the screen can be adjusted by controlling the delay circuit 26.

Namely, as shown in FIGS. 8a to 8e, the relative positions of the ordinary television picture A and the still picture B can be freely controlled.

FIG. 9 shows another exemplary configuration of the circuit shown as a dashed-line block 18 in FIG. 1. In FIG. 9, a circuit 45 consisting of blocks 47 to 49 serves to generate a scanning signal applied to the storage tube 8. A circuit 46 also generates a vertical scanning signal applied to the storage tube 8 and has the same circuit configuration as the circuit 45 and therefore the detailed description of the circuit 46 is not given here. The block 47 is a circuit to generate a saw-tooth wave in synchronism with the horizontal sync signal, the block 48 a gate circuit and the block 49 a Schmitt trigger to detect that the output of the circuit 47 has reached a predetermined level and then to generate a rectangular wave.

Figure 10:
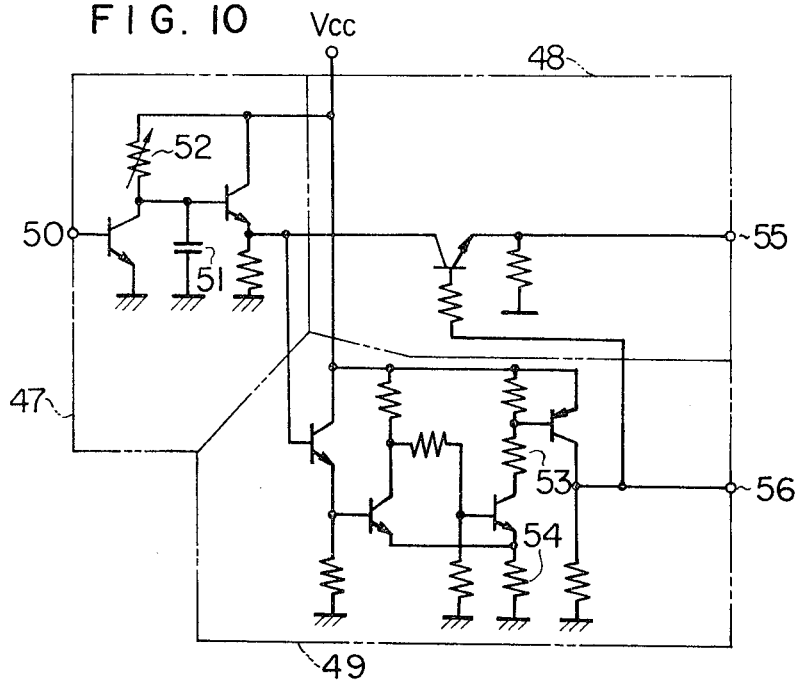
FIG. 10 is a circuit of the principal portion shown in FIG. 9.

FIG. 10 shows the detailed electrical connection of the circuit shown in FIG. 9, in which there are included an input terminal 50 to which the horizontal sync signal is applied, a 51 capacitor for integration, a variable resistor 52 to change the sweep speed of the signal applied to the gate circuit 48 and resistors 53 and 54 to determine the levels at which the gate circuit 48 is actuated.

Figure 11A:
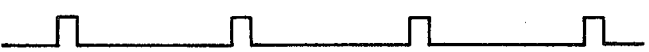
FIGS. 11a to 11d show waveforms appearing at points in the circuit shown in FIG. 10.
Figure 11B:
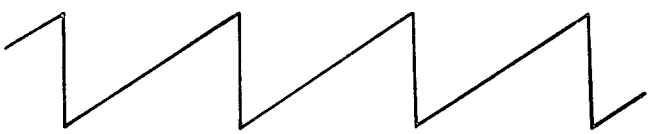
Figure 11C:
Figure 11D:

The operation of the circuit shown in FIG. 9 will now be described. The horizontal sync signal whose waveform is shown in FIG. 11a, is applied to the saw-tooth wave generator 47, which delivers a signal whose waveform is shown in FIG. 11b. This saw-tooth wave shown in FIG. 11b is passed through the gate circuit 48 to appear at the output terminal 55. The Schmitt trigger 49 generates a rectangular wave whose waveform is shown in FIG. 11c only during a period within which the amplitude of the input saw-tooth wave is below a predetermined level and thereby controls the gate circuit 48 to cause a saw-tooth wave, whose waveform is shown in FIG. 11d, to be applied to the storage tube 8. In this way, the horizontal scanning signal for reproduction of a still picture can be obtained. In like manner, the vertical scanning signal for reproduction can be derived from the circuit 46. The zooming of the still picture can be effectively performed by controlling the threshold level of the Schmitt trigger 49 along with the scanning speed of the saw-tooth wave generator 47.

What we claim is:

1. A television receiver comprising means for receiving a television signal; a picture tube for displaying the received television signal as the corresponding television picture on the screen of said picture tube; means for extracting a part of a video signal for a single frame from the received television signal at any desired moment; a storage tube having a target for storing the extracted video signal; means for repeatedly reading the stored video signal out of the storage tube by applying horizontal and vertical sawtooth deflection signals to said storage tube whose periods are not equal to the respective horizontal and vertical sync repetition rates of the received television signal, amplitude controlling means for controlling the amplitude of the sawtooth generated by said means for repeatedly reading, and level controlling means for controlling the DC level of said sawtooth thereby effecting the zooming of the picture stored in the storage tube; and means for eliminating a part of the television picture on the screen and for displaying the video signal read from the storage tube as a still picture on the vacant part of the screen.

2. A television receiver as claimed in claim 1 wherein means is provided which superposes a DC component on the horizontal and vertical scanning signals delivered to said repeatedly reading means so that the position of scanning on the target of said storage tube is controlled by controlling the DC component to select the position on the screen where the still picture is to be zoomed.

3. A television receiver as claimed in claim 1 wherein there are provided a switch operated after the completion of the writing operation of said storage tube and a reproduction time setting means to determine the period of reading in response to the actuation of said switch, so that said repeatedly reading circuit is controlled by the output of said setting circuit and the scanning signal aplied to said storage tube for reproduction is generated.

4. A television receiver as claimed in claim 1 wherein there is provided a change-over switch to selectively apply to said picture tube the video signal read out of said storage tube and a means to drive said change-over switch.

5. A television receiver as claimed in claim 4 wherein the synchronous signal contained in said television signal is fed to said repeatedly reading means through a delay circuit whose delay time is variable and the position of the still picture reproduced from said storage tube on the picture tube screen is varied by shifting the delay time of said variable delay circuit.

* * * * *